May 5, 1964  A. J. KOENIG  3,131,483
OPTICAL MEASURING SCOPE
Filed June 5, 1961  2 Sheets-Sheet 1
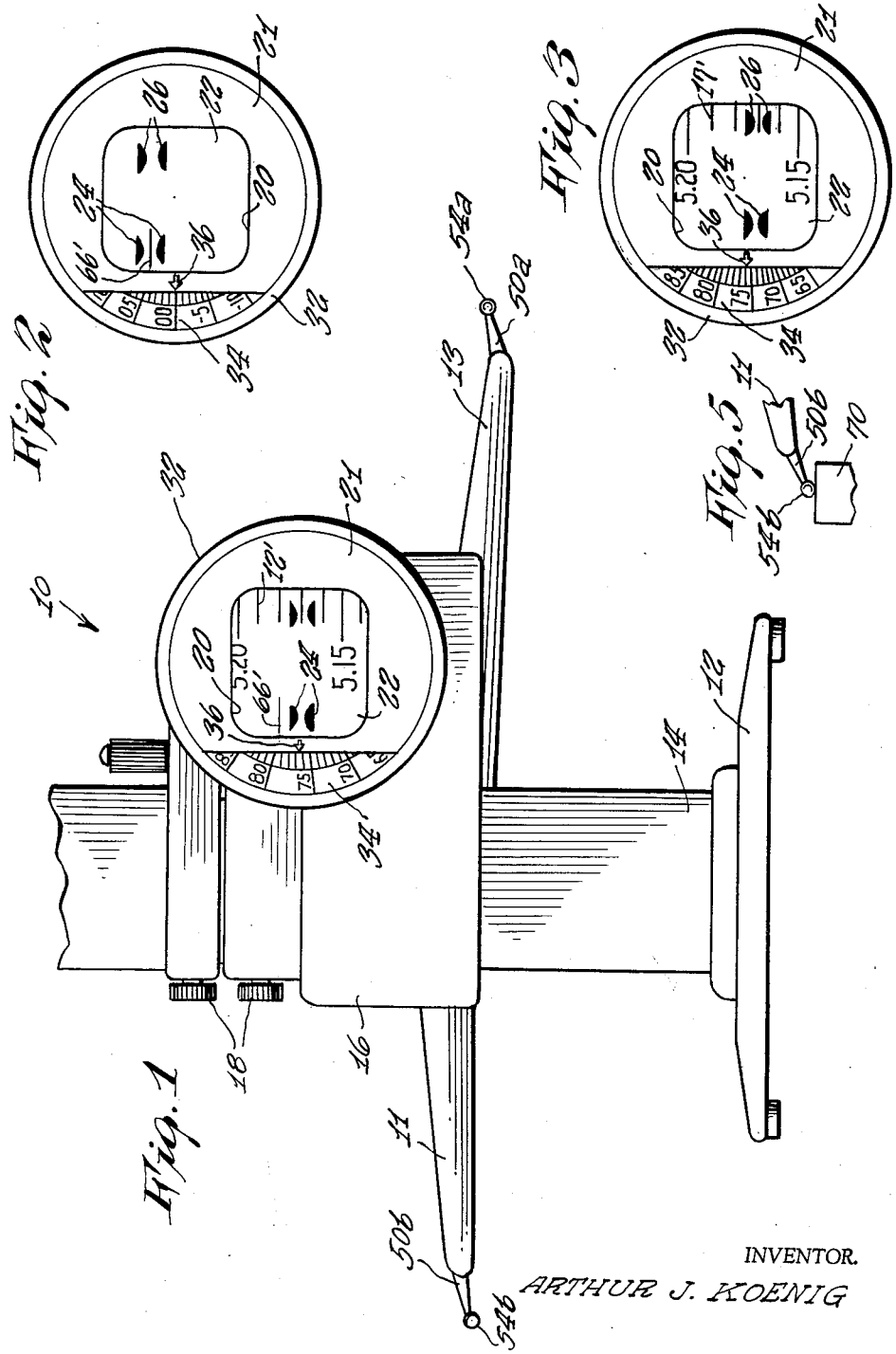
INVENTOR.
ARTHUR J. KOENIG

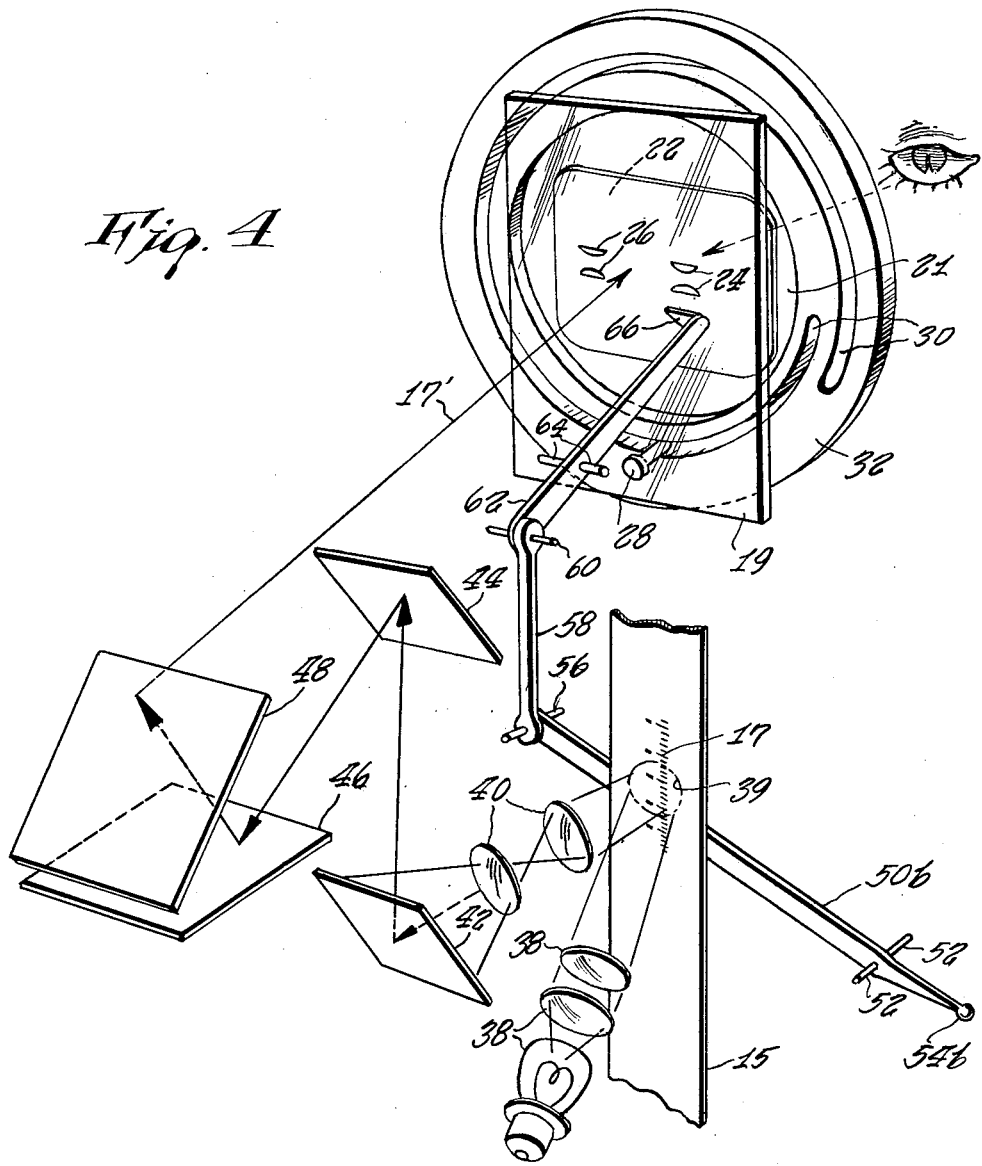

3,131,483
OPTICAL MEASURING SCOPE
Arthur J. Koenig, Brooklyn, N.Y.
(Box 381, Arkville, N.Y.)
Filed June 5, 1961, Ser. No. 114,876
7 Claims. (Cl. 33—172)

This invention relates to measuring apparatus and more particularly to an optical measuring scope.

It is an object of the present invention to provide an optical measuring scope which can be conveniently and readily used for various inside and outside measurements.

A further object of the present invention is to provide an optical measuring scope which will provide precise, accurate, error-free readings during use.

Still an additional object of the present invention is to provide a highly accurate optical measuring scope for reading measurements to close tolerances.

Other objects of the invention are to provide an optical measuring scope bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a fragmentary front plan view of an optical measuring scope made in accordance with the present invention;

FIGURE 2 is a plan view of the gauge portion of the scope shown in FIGURE 1 in an adjusted position;

FIGURE 3 is a view similar to FIGURE 2, in a still further adjusted position;

FIGURE 4 is a perspective diagrammatic view of the operating parts of the present invention;

FIGURE 5 is a fragmentary plan view of the device in actual use.

Referring now more in detail to the drawing, an optical measuring scope 10 made in accordance with the present invention is shown to include a base 12 having an upstanding stanchion 14 upon which a housing 16 is slidably supported with laterally outwardly extending arms 11, 13. The stanchion 14 is provided with a graduated scale 17, the image 17' of which is transmitted to a ground glass viewing screen 22 within a window opening 20 of the gauge plate 21, in a manner hereinafter more fully described.

Mounted behind the ground glass screen 22, is a transparent plate 19, upon which two sets of half moon elements form two catchforks 24, 26. This plate 19 is vertically adjustable relative to the window opening 20 by means of a pin 28 secured to the lower end thereof, having one end slidably received within a convoluted groove 30 formed in a knob plate 32 of the gauge plate 21. A graduated scale 34 is imprinted upon this knob plate 32 and is rotatable relative to a pointer 36 imprinted upon the gauge plate 21. Thus, as is clearly shown in FIGURE 4, rotation of the dial plate 32 with the pin 28 slidably received within the groove 30, will cause a slight vertical adjustment of the transparent plate 19, for purposes hereinafter more fully described.

The main housing 16 of the present invention, mounted between the arms 11, 13, includes a magnified light source 38 which is focused upon the scale plate 15 of the stanchion 14, so that an area 39 is constantly illuminated in all adjusted positions of the housing 16 relative to the stanchion 14. Manually operated knobs 18 control the vertical adjustment of the housing 16 with respect to the base 12. The illuminated area 39 is enlarged through a lens system 40 and reflected by a mirror 42 toward a directional mirror 44, from which it is reflected upon a reversing mirror 46 and transmitting mirror 48 through the transparent plate 19 and on to the ground glass screen 22 in the form of the image 17'. Thus, the area 39 of the scale 17 corresponding to the position of the main housing 16 is automatically and constantly brought into view upon the viewing screen 22 in all positions of the main housing 16 relative to the base 12.

An object sensing feeler lever 50b is pivotally supported adjacent to its outermost end upon a bearing 52 within each one of the arms 11, 13. One of the levers 50a is provided with an upwardly directed terminal having an object sensing bead 54a, whereas the other lever 50b is provided with a downwardly turned terminal having an object sensing bead 54b. The one lever 50a is used for inside measurements, whereas the other lever 50b illustrated in FIGURE 4, is used for outside measurements.

The innermost end of each lever 50a, b is pivotally connected by means of a pin 56 to one lower end of a connecting link 58 pivotally connected at its opposite end by means of a pin 60 to an indicating lever 62. This lever 62 is pivotally mounted upon bearings 64 within the main housing 16, and has a knife edge 66 extending laterally outwardly from the opposite free end thereof directly behind the transparent plate 19 and relative to one catchfork 24. Thus, the shadow of the knife edge 66 is transmitted to the ground glass screen 22 adjacent to the catchfork 24, in the form of the image 66'.

The operation of this apparatus will now be readily understood. Substantially the same procedure is followed for both inside and outside measurements. Thus, in explaining the operation of the device for an outside measurement, the same will apply to using the apparatus for inside measurement with the opposite side arm 13. An object is placed upon the surface corresponding to the supporting surface of the base and the knob 18 actuated to bring the housing 16 into the vicinity of the object. The gauge is first set by rotating the knob plate 32 to bring the "00" line into proximity with the indicator arrow 36.

By then adjusting the knob 18, the housing 16 can be moved so as to bring the sensing head 54b of lever arm 50b into contact with the object being measured and which is supported upon the same surface as the base 12 of the apparatus.

During such adjustment of the housing 16, the shadow image 66' of the knife edge 66 is brought between the catchfork portions 24, as shown in FIGURE 2. During such adjustment of the housing 16, the lens system will transmit a different portion of the scale 17 to the screen 22, the image 17' thereof corresponding roughly to the dimensions of the object, after which the gauge knob 32 is adjusted so as to bring the nearest line of the scale image 17' between the elements of the second catchfork 26. Such adjustment will provide the first decimal points of the measurement reading, and the rotation of the knob 32 and resultant rotation of the scale 34 relative to the indicator 36 will supply the next two decimal points of the reading. In other words, the amount of rotation of the knob 32 that is required to bring the nearest marker of the scale image 17' into the center of the catchfork 26 is the amount of deviation from the scale marking, and thus is the third and fourth decimal point reading of the measurement.

It will now be appreciated that an extremely effective and highly leveraged optical measuring device has been provided for all types of measurement purposes.

While various changes may be made in the detail construction, it shall be understood that such changes shall be within the spirit and scope of the present invention as defined by the appended claims.

What I claim as new and desire to protect by Letters Patent of the United States is:

1. An optical measuring scope comprising, in combination, a base, a stationary post having a measuring scale mounted upon said base, a housing slidably mounted upon said post having a light source and image magnifying system, said housing having a viewing screen with a reference marking, reflector means for directing the magnified image of said scale to said viewing screen, an object sensing feeler pivotally carried by said housing, a reference indicator movable relative to said viewing screen, mechanical advantage means acting between said feeler and said indicator, and manually adjustable means carried by said housing to determine the measurement of an object situated between a surface supporting said base and said feeler.

2. The combination according to claim 1, wherein said object sensing feeler comprises a lever pivotally supported adjacent to one end upon said housing having a sensing bead at the outermost extremity of said one end for contact with the object being measured.

3. The combination according to claim 2, wherein said reference marking comprises a transparent plate mounted within said housing having a first catchfork for adjustment within said viewing screen.

4. The combination according to claim 3, wherein said reference indicator comprises a knife edge mounted behind said screen and movable relative to said catchfork in response to movement of said sensing bead.

5. The combination according to claim 4, wherein said mechanical advantage means comprises linkage acting between said feeler lever and said knife edge for adjusting said knife edge relative to said screen in response to adjustment of the position of said sensing bead.

6. The combination according to claim 5, wherein said manually adjustable means comprises a gauge knob concentrically supported relative to said screen having a convoluted groove, and said transparent plate having a follower pin slidably received within said convoluted groove for effecting movement of said transparent screen radially of said screen to adjust the position of said catchfork relative to said knife edge.

7. The combination according to claim 6, wherein said viewing screen comprises a ground glass panel for receiving the image of said scale transmitted thereto.

References Cited in the file of this patent
UNITED STATES PATENTS

| | | |
|---|---|---|
| 1,139,936 | Warner | May 18, 1915 |
| 2,324,813 | Barrott et al. | July 20, 1943 |
| 2,728,991 | Rinker | Jan. 3, 1956 |
| 2,959,087 | Strickland | Nov. 8, 1960 |